April 28, 1925.

H. C. WALLACE

FAN BLOWER

Filed Feb. 5, 1923

1,535,363

INVENTOR
Halbert C Wallace
BY
ATTORNEY

Patented Apr. 28, 1925.

1,535,363

UNITED STATES PATENT OFFICE.

HALBERT C. WALLACE, OF KANSAS CITY, MISSOURI.

FAN BLOWER.

Application filed February 5, 1923. Serial No. 616,951.

*To all whom it may concern:*

Be it known that I, HALBERT C. WALLACE, a citizen of the United States, residing at Kansas City, in the county of Jackson and State of Missouri, have invented certain new and useful Improvements in Fan Blowers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to fan blowers and the primary object of the invention is to provide a fan blower for imparting velocity to grain and other solids so that the solids can be directed through a tubular conduit to the point of distribution.

In devices of this kind the air and grain is fed into the fan casing and sometimes the grain piles up or accumulates in the bottom of the fan casing so that the fan blades have a stirring action or impact against the grain in moving it from the casing.

The prime object of this invention is to introduce the grain into the fan casing by floating it on the incoming air which is the medium for carrying it through the conduits. In order to accomplish the result, I arrange the air intake below the grain inlet so that the air will enter the fan casing in parallel stream lines below the grain and since the air rushes into the fan with considerable velocity, it will support the grain so that the grain will be floated into the casing and before it has time enough to gravitate to the bottom of the casing, it will be picked up by the currents of air generated by the fan blades and it will be carried into the conduit of the fan blower or conveyor.

Figure 1:
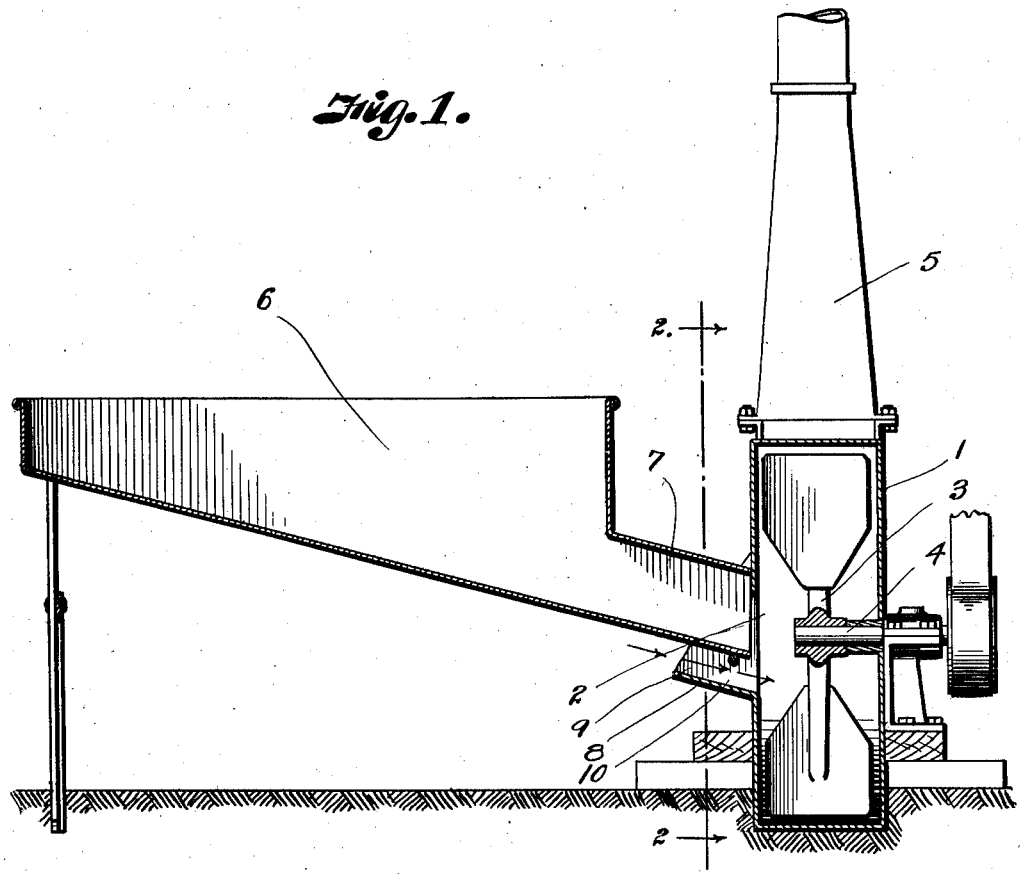
Figure 2:
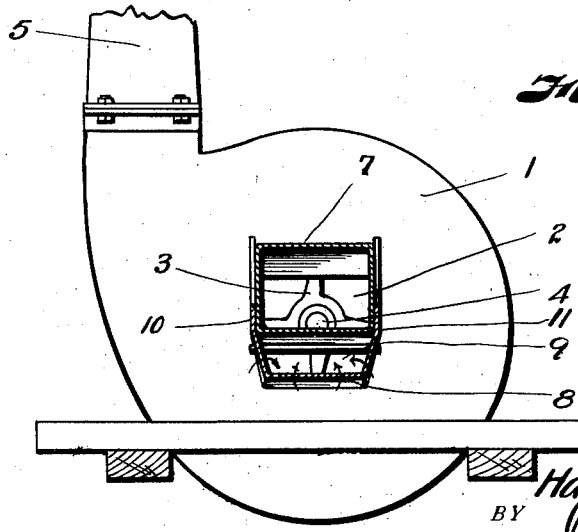

The illustrated embodiment of the invention will be clearly apparent by reference to the following description in connection with the accompanying drawings, in which Fig. 1 is a sectional view through a fan blower constructed in accordance with my invention showing the grain intake and the air intake in their proper relative positions, and Fig. 2 is a sectional view on the line 2—2 of Fig. 1.

The fan casing 1 is of the usual snail-shell type and it has an opening 2 in one side wall. Within the casing 1 is an air impeller or fan 3 on a shaft 4, which may be driven by any suitable means to rotate the fan. The outlet for the casing is the usual conduit 5. A grain delivery receptacle or hopper 6 has a discharge chute 7, which empties into the casing 1 so that the grain will be delivered into the fan casing. Below the chute 7 is a flange 8 spaced from the bottom of the chute 7 to provide an air inlet space 9. The flange 8 is shown as substantially parallel with the bottom of the chute 7 and the flange 8 has two side walls 10 and 11, which fit against the side walls of the chute 7. Therefore, when the fan is operated, air will be drawn into the casing 1 below the discharge for the receptacle 6 and the lateral stream lines of air will have sufficient velocity and, therefore, buoyancy, to float the grain on the body of air when it enters the fan casing and, due to centrifugal force, the grain will be delivered into the chute 5 without liability of gravitating to the bottom of the fan casing. Therefore, liability of the grain piling up in the fan casing will be entirely eliminated.

What I claim and desire to secure by Letters-Patent is:

A fan blower comprising a casing having an air impeller therein, the casing having a side opening, in combination with a hopper having a discharge chute emptying into the casing through the opening, the bottom of the chute being spaced from the lower edge of the opening to provide an air space below the chute whereby air may enter the casing in transverse stream lines below the discharge end of the chute to float the material in a solid stream discharged from the hopper before it is driven through the casing and a flange at the lower edge of the opening and extending substantially parallel with the hopper, the flange having side walls for forming a space substantially co-extensive with the portion of the opening which is below the discharge end of the chute.

In testimony whereof I affix my signature.

HALBERT C. WALLACE.